United States Patent [19]

Gillotte

[11] Patent Number: 4,805,787
[45] Date of Patent: Feb. 21, 1989

[54] HANGING COMPARTMENT SUPPORT SYSTEM

[75] Inventor: Mark P. Gillotte, Columbia, S.C.

[73] Assignee: National Service Industries, Atlanta, Ga.

[21] Appl. No.: 851,118

[22] Filed: Apr. 11, 1986

[51] Int. Cl.[4] .............................................. A47F 43/00
[52] U.S. Cl. ..................................... 211/191; 211/208; 403/260
[58] Field of Search ................. 211/191–193, 211/208, 187, 46; 403/260, 247, 248, 259

[56] References Cited

U.S. PATENT DOCUMENTS 3,846,944 11/1974 Lambert .......................... 211/187 X
4,106,630 8/1978 Rosenband ...................... 211/191

FOREIGN PATENT DOCUMENTS 611117 10/1960 Italy ..................................... 403/260

Primary Examiner—David A. Scherbel
Assistant Examiner—Caroline D. Dennison
Attorney, Agent, or Firm—Mason, Fenwick & Lawrence

[57] ABSTRACT

A hanging compartment support system has a hanger frame including a pair of parallel hanger support rails connected at their ends to a pair of parallel support beams having pin means extending outwardly at opposite ends to be removably positioned in keyhole openings on vertical columns of a main support frame; a second hanger frame is identical to the first hanger frame except for the provision of cantilever support flanges extending from each end of its support beams for resting support on one end of one of the lower flanges of shelf support beams mounted on the main support frame.

13 Claims, 3 Drawing Sheets

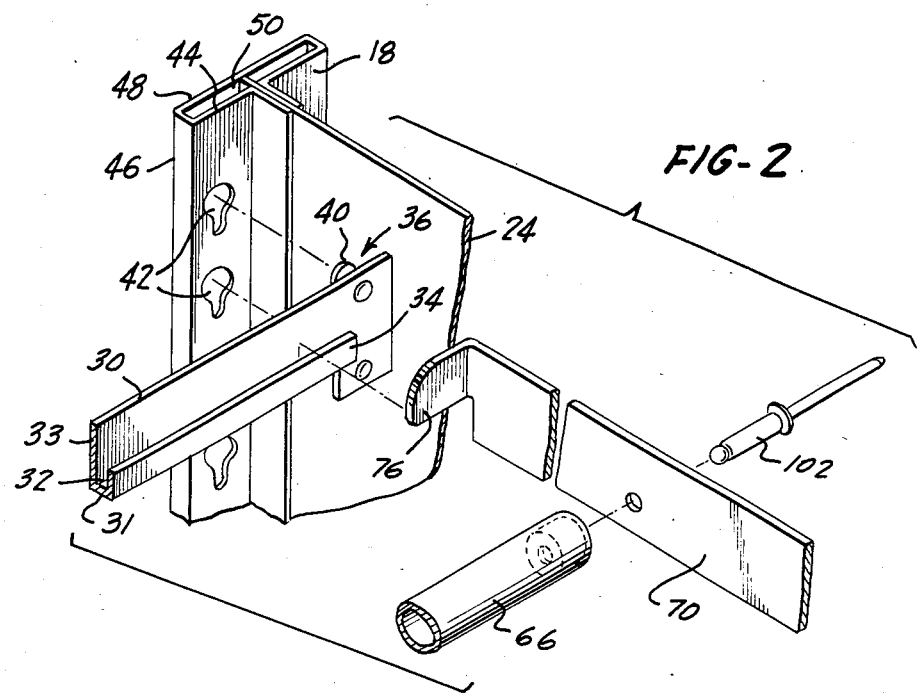
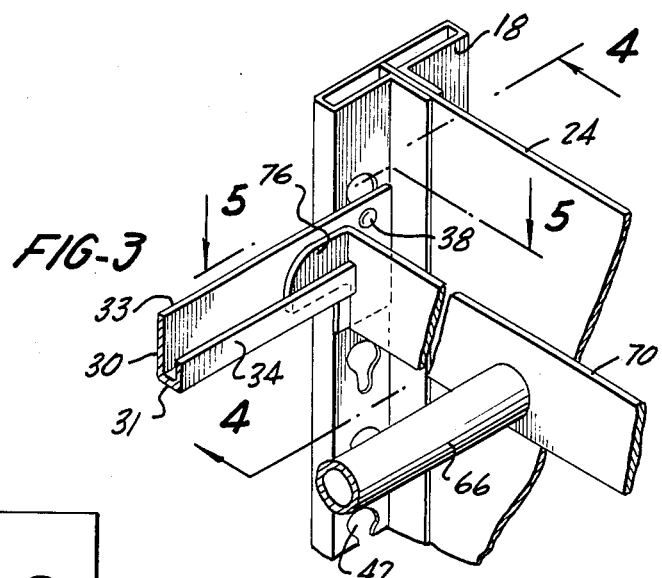
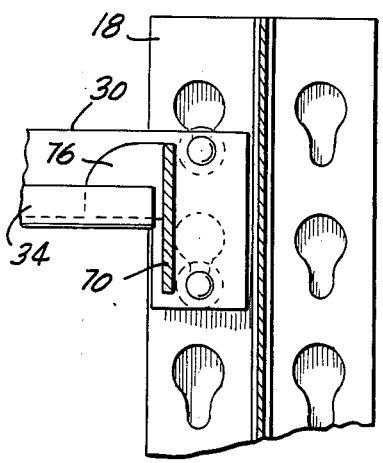
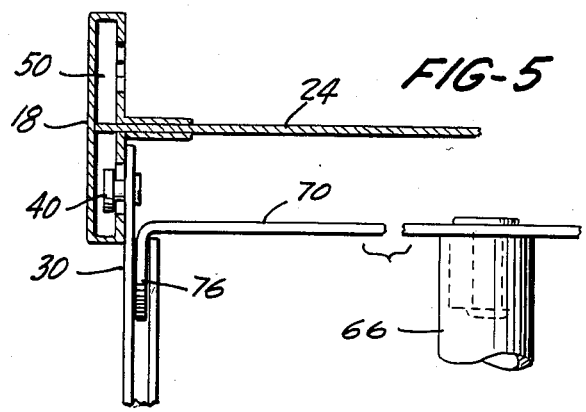

HANGING COMPARTMENT SUPPORT SYSTEM

BACKGROUND OF THE INVENTION

The present invention is in the field of hanging or suspension file support devices and is particularly directed to a new and improved means for the positioning of the suspension file support frame on a main support frame in a desired vertical position thereon.

Suspension files comprise U-shaped folders formed of heavy flexible paper, cardboard, vinyl or the like which have two hanger members positionable on a hanger support frame including a pair of parallel hanger support rails extending tranversely to the folder. The ends of the support rails have been previously supported in U-shaped horizontal rail support beams in the form of channel members extending perpendicularly to the support rails. The U-shaped channels are positioned so that the U-shape is inverted as viewed from one end and they consequently open downwardly and are supported on removable clip members positioned in keyhole slots provided in vertical columns of a main frame member. Apertures are provided in one of the side plates of each U-shaped rail support beams with the apertures being slightly larger than the outer diameter of the rails and the ends of the rails being loosely inserted in such apertures. This arrangement results in a loose non-fixed sloppy relationship between the support rails and the U-shaped rail support beams. Additionally, the rail support beams are loosely supported on the clips in the main frame member and the overall system is characterized by flexibility and lack of rigidity and stability.

Systems of the aforementioned type are sold by Ellis Systems & Supply of Countryside, Ill. and include shelf support beams of U-shaped cross-section which are affixed to vertical frame members by pins having enlarged head portions which are inserted in keyhole shaped lock slots on the vertical frame means and move downwardly into a locked position. Such shelf support beams are of J-shaped configuration as viewed from the end and the positioning of such beams on the vertical frame members block the keyhole slots and precludes the support of a suspension file hanger frame in a vertical alignment with such beams. Therefore, the hanger suspension frames must be spaced a substantial distance below such shelf support beams, regardless whether or not such beams are supporting a shell and substantial space is consequently wasted.

While the prior art is replete with shelving systems and the like incorporating vertical standards with keyhole shaped slot openings to which a variety of shelf support and other means are attached, the systems for supporting suspension files have continued to suffer from the above-discussed shortcomings. Examples of the prior art employing vertical support means and pin and keyhole locking arrangement are found in U.S. Pat. Nos. 1,320,982; 2,462,321; 2,925,920; 2,932,409; 3,045,834; 3,294,250; 3,422,962; 3,592,345; 3,612,290; 3,637,087; 4,074,812; and 4,106,630.

Therefore, it is the primary object of the present invention to provide a new and improved hanging compartment frame support means. A further object of the present invention is the provision of a new and improved hanging compartment frame support means which can be positioned closely beneath shelf support beams of a conventional support system.

SUMMARY OF THE INVENTION

Achievement of the foregoing objects is enabled by the preferred embodiments of the invention by the provision of a rigid hanger frame that is removably mounted on the vertical columns or standards of a conventional main frame having vertically aligned keyhole mounting slots therein. The rigid hanger frame includes a pair of parallel hanger support rails on which a plurality of hanging compartments can be supported. The support rails are fixedly connected at their ends to a pair of parallel support beams by either a threaded connector or a pop rivet arrangement connected to plugs in the ends of the rail members. The rail members are of tubular configuration and include fixedly positioned plugs in their end portions with one embodiment employing a threaded plug to which a threaded connector is connected for attachment to the support beam and another embodiment employing an axially apertured plug through which a pop rivet is extended prior to expansion for effecting a permanent connection between the end of the rail and the associated support beam.

Each end of each of the support beams is provided with an offset lateral flange extending substantially perpendicularly with respect to the support beam in a direction opposite the side of the support beam to which the rails are connected. An aperture is provided in the ends of the lateral flanges and a moveable pin comprising a relatively narrow diameter shank portion and an enlarged head portion is mounted in the aperture. The pins are retained in the aperture by an enlargement on the inner end of the narrow diameter portion and are consequently mounted for limited axial movement. The spacing between the lateral flanges on each support beam is such that the support beams can be positioned between the front to rear aligned vertical columns of the main frame to permit the connector pins to be moved outwardly to cause the head portions of the pins to pass through the upper larger portion of a keyhole slot followed by vertical downward movement of the pin to provide a locking arrangement of the pin and its associated beam in the slot. Consequently, the support beams are securely connected to the vertical columns of the main frame and are also securely connected to the parallel hanger support rails to provide an overall structure that is of great strength. The improvement completely eliminates the use of separate clip members positioned in the vertical columns for supporting the U-shaped channel beams of the prior known conventional constructions. Also, the construction permits pre-assembly of the support frames in the factory prior to shipment and avoid the needless and frequently expensive labor of assembling the systems on the site as was necessarily required by the prior known systems employing the U-shaped channel, etc.

Another feature of the invention is the employment of a rigid hanger frame that can be positioned on shelf support beams of conventional shelving systems. This aspect of the invention employs a pair of support rails that are identical to those of the above-discussed embodiment and which are connected to support beams at each end in the same manner as the previously discussed embodiment. However, the support beams of this aspect of the invention have inwardly extending lateral flanges on each end which extend inwardly toward each other, in a direction exactly opposite the direction that the flanges of the first embodiment extend from their respective support beams. These inwardly extending lateral flanges are dimensioned to fit over, in and on the J-shaped shelf support beams and rest thereon so as to provide support for the parallel rails of the hanger frame in an area immediately beneath any shelving supported on the shelf support beams. Therefore, it is possible for the hanging compartment support rails to be positioned immediately below such shelving so as to achieve a optimum space savings.

BRIEF DESCRIPTION OF THE DRAWINGS

FIG. 2 is an enlarged perspective view illustrating a portion of the arrangement for mounting a hanging compartment support frame on shelf support beam means;

FIG. 3 is perspective view illustrating the structural components of FIG. 2 in assembled condition;

FIG. 4 is a sectional view taken along lines 4—4 of FIG. 3;

FIG. 5 is a sectional view taken along lines 5—5 of FIG. 3;

DESCRIPTION OF THE PREFERRED EMBODIMENTS

Figure 1:
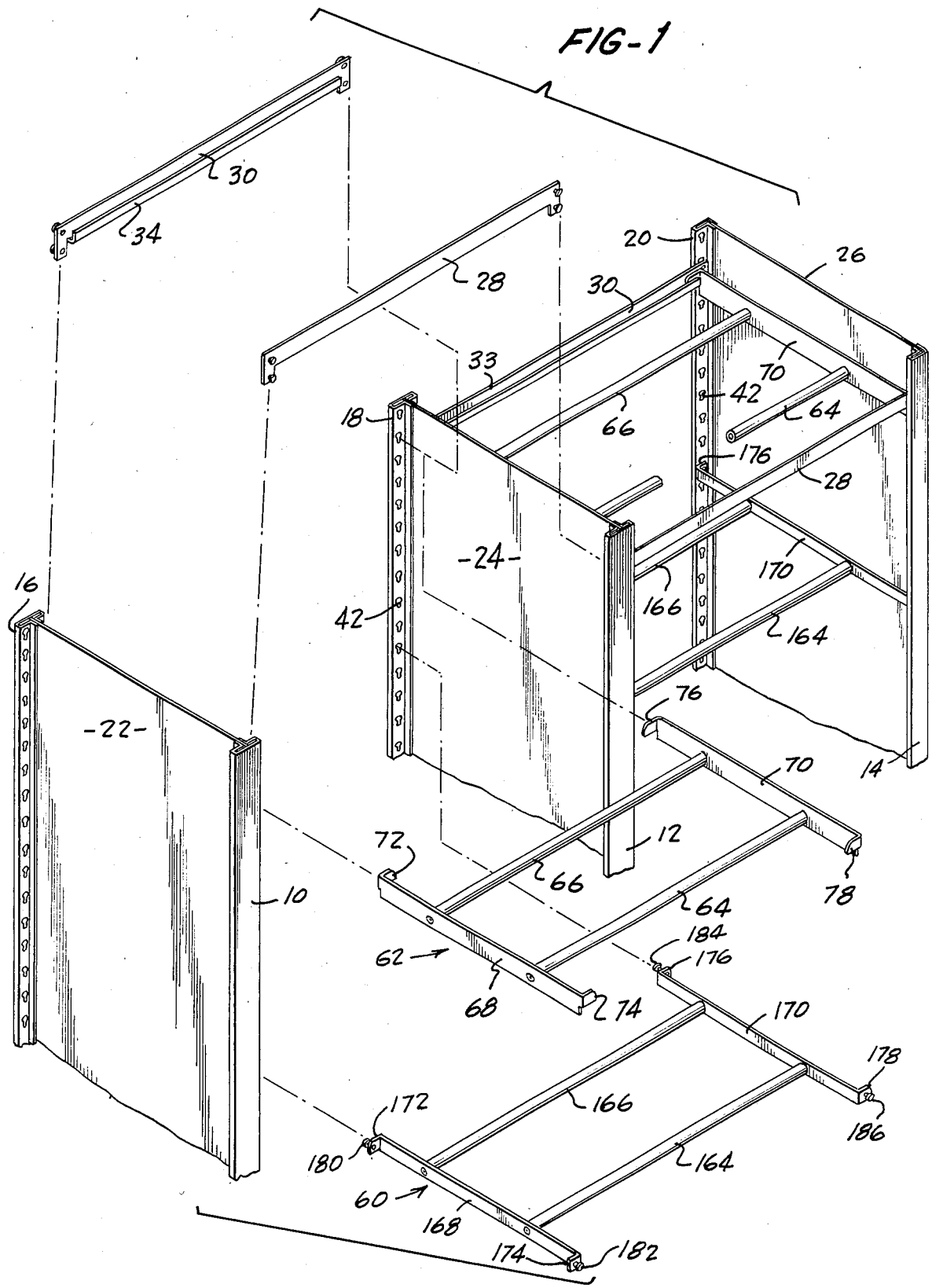
FIG. 1 is an exploded perspective view of the preferred embodiments of the invention.
Figure 6:
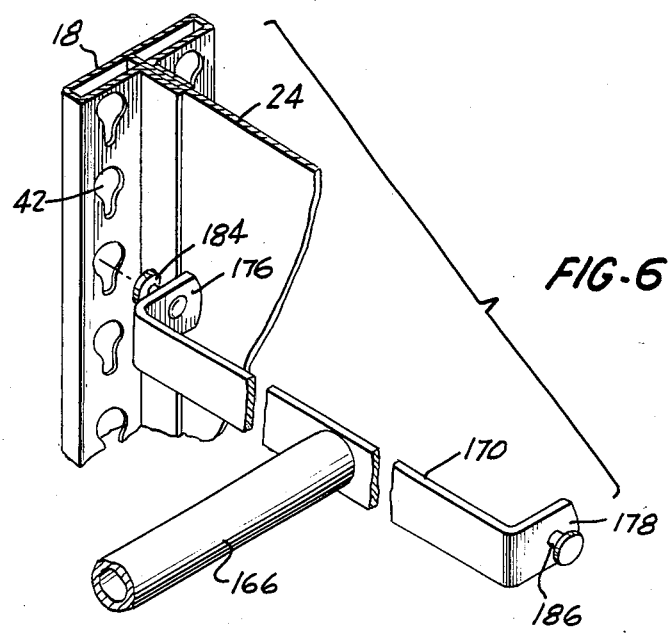
FIG. 6 is an exploded perspective view of a portion of a rigid hanger frame being mounted directly on vertical columns of a main frame.
Figure 7:
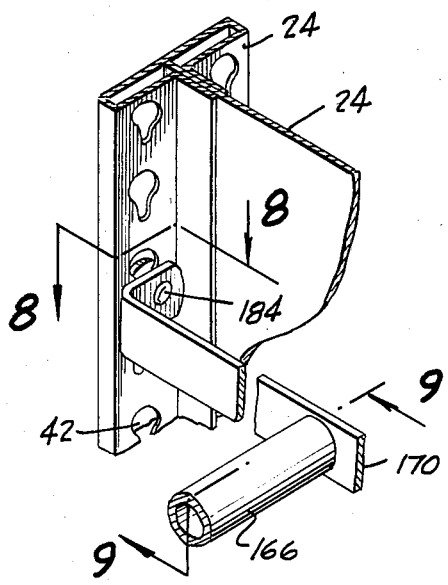
FIG. 7 is a perspective view similar to FIG. 6 but illustrating the parts in locked position.
Figure 8:
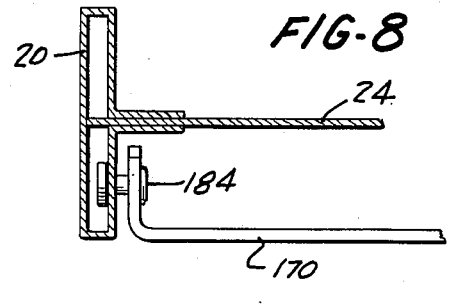
FIG. 8 is a sectional view taken along lines 8—8 of FIG. 7.

Attention is initially invited to FIG. 1 of the drawings which illustrates various aspects of the invention as installed in a conventional main support frame. The main support frame comprises front vertical column members 10, 12 and 14 and rear vertical column members 16, 18 and 20. The aligned vertical columns 10, 16 are connected by a panel 22 and aligned columns 12, 18 are connected by a panel 24 with columns 14, 20 being similarly connected by a panel 26. Additionally, front and rear shelf support beams 28 and 30 are mounted to respectively extend in horizontal alignment between beams 10, 12 , 14 and beams 16, 18, 20.

The support beams 28, 30 are identical and are of J-shaped cross-section as best shown by beam 30 as illustrated by FIG. 2. A bottom surface 31 defines the lower extent of opening 32 and provides support for a rigid hanger frame 62. When used for supporting a shelf, the shelf is received and held in position by a long flange 33 of beam 34. The shelf support beams are supported on the vertical columns by a pair of riveted pin members 36 and an enlarged head portion 40. The vertical columns are provided with a plurality of aligned keyhole openings 42 in their inwardly facing panel components 44. It should be observed that the vertical columns additionally include side panel components 46 a rear panel component 48 with the panel components defining an interior space 50 as best shown in FIG. 2. The pins 36 are capable of limited axial movement in the mounting holes provided in the support beams but cannot be withdrawn therefrom due to an enlargement 39 on the shank portion. It should be understood that the above-discussed construction is conventional; however, it is used as part of a new and unobvious combination as discussed hereinafter.

The invention includes rigid column mounted hanger support frame means 60 and rigid shelf beam mounted hanger support frame means 62 as shown in FIG. 1. The shelf beam mounted rigid hanger support frame 62 will first be discussed with reference to FIGS. 1, 2, 3, 4 and 5. Specifically, the support frame 62 includes first and second hanger support rails 64, 66 oriented in parallel horizontal manner and being of tubular hollow construction. The outer ends of the first and second hanger support rails 64, 66 are connected to parallel support beams 68, 70 of rectangular cross-section. Support beam 68 has inwardly extending lateral support flanges 72, 74 and beam 70 similarly has inwardly extending lateral support flanges 76, 78. The flanges 76, 78 are spaced apart a specific distance which permits them to rest in the space 32 on bottom panel 31 of the shelf support beams 28 and 30 and the support flanges 72, 74 are similarly spaced for positioning on the opposite ends of the same shelf support beam.

Fixed connection of the rails 64, 66 to the support beams 68, 70 is effected alternatively in one of two ways in the same manner that the rails of the rigid column mounted hanger support frame means 60 are connected to their associated support beams as discussed hereinafter.

The nature of the rigid column mounted hanger support frame means 60 will now be discussed with reference to FIGS. 6 through 10. Frame 60 comprises first and second hanger support rails 164 and 166 which are connected to end support beams 168 and 170 each of rectangular cross-section. The outer ends of the support beams 168, 170 are provided with outwardly extending lateral flanges which permit connection of the frame to the vertical columns 12, 18, 20, 14 in a manner to be discussed. Specifically, support beam 168 has outwardly extending lateral flanges 172, 174 and support beam 170 has outwardly extending lateral flanges 176 and 178. Apertures are provided in the flanges 172, 174, 176 and 178 for respectively receiving mounting pins 180, 182, 184 and 186, all of which are similar to the mounting pins 36 and which are mounted for limited axial reciprocation in holes in the flanges. Consequently, the column mounted hanger support frame 60 can be mounted on the vertical support columns by positioning it so that the pin members can be extended through the upper larger portion of the keyhole openings 42, through which the pin head can be moved followed by subsequent downward movement of the pin to lock the assembly in position on the vertical columns. Consequently, a rigid construction is provided and which can be preassembled as contrasted to the prior known suspension file support frames.

Figure 9:
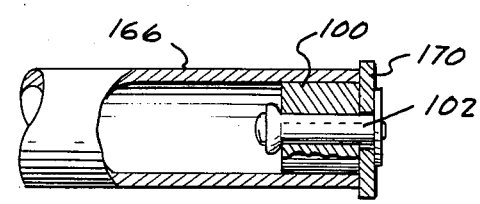
FIG. 9 is a bisecting sectional view illustrating one manner of connecting rail portions of the rigid hanger frame to an end support beam.
Figure 10:
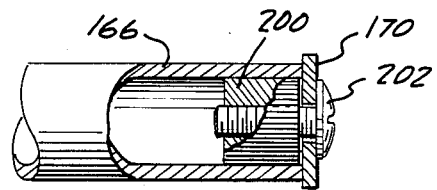
FIG. 10 is a partial sectional view illustrating a second manner of connecting a rail member to a support beam.

The rail members 66, 64 are connected to the support beams 168 and 170 in one of two ways respectively illustrated in FIGS. 9 and 10. In FIG. 9 the connection is effected by providing a plug fixed in the end of the rail 166 and including a central aperture through which a pop rivet 102 is extended and actuated. In the second embodiment, a plug 200 is provided with an axially extending threaded aperture in which a threaded screw member 202 is threadably connected to provide a rigid connection between the rail 166 and the support beam 170. It should be observed that the rail member 66 illustrated in FIG. 2 is shown prior to connection to a pop rivet 102 and the rails of the frame 62 can be connected to their associated support beams in the manner of either FIG. 9 or FIG. 10 as desired.

Therefore, it will be understood that the subject invention provides a uniquely rigid construction by the provision of rigid hanging compartment support frame members which are strong and sturdy and which will not wobble when in use. Moreover, great savings are achieved by the use of frame means 62 which can be positioned on shelf support means 30 and can be used on such beams even when such beams are used for supporting a shelf. Numerous modifications of the disclosed embodiments will undoubtedly occur to those of skill in the art and it should be understood that the spirit and scope of the invention is to be limited solely by the appended claims.

I claim:

1. In a hanging compartment support system of the type including a frame having first and second front vertical support columns and first and second rear vertical support columns with each vertical support column having vertically aligned downwardly tapering attachment permitting openings for receiving members to be supported by said frame, the improvement comprising a hanger frame including a pair of parallel hanger support rails, a pair of parallel rigid support beams each respectively being fixedly connected to one end of each of said support rails and pin means extending outwardly of opposite ends of each of said support beams and removable positioned in one of said attachment permitting openings.

2. The invention of claim 1 wherein said pin means each include a narrow diameter shank portion and a larger diameter head portion.

3. The invention of claim 2 wherein each end of each of said support beams includes a lateral flange in which the narrow diameter shank portion of one of said pins is mounted.

4. The invention of claim 3 wherein each of said lateral flanges includes an opening in which the narrow diameter shank portion of the pin mounted in said flange is mounted for limited axial movement.

5. The invention of claim 4 wherein said support rails are of hollow tubular construction and include plug means fixed in each end and an opening in said plug means for receiving an elongated connector extending from an associated support beam for fixedly connecting said associated support beam to said support rail.

6. The invention of claim 5 wherein said elongated connector is a threaded screw.

7. The invention of claim 5 wherein said threaded connector is a pop rivet.

8. The invention of claim 1 additionally including front and rear shelf support beams respectively extending between said front and rear support columns and having a lower flange on which a shelf can be positioned for support, a second hanger frame comprising a second pair of parallel hanger support rails, a second pair of parallel support beams each respectively being fixedly connected to one end of each of said second parallel hanger support rails and a cantilever support flange extending from each end of each of said second support beams and resting on one end of one of said lower flanges of one of said shelf support beams.

9. The invention of claim 4 wherein said support rails are of hollow tubular construction and include plug means fixed on each end and with the plug means including an opening for receiving an elongated connector extending from an associated support beam for fixedly connecting said associated support beam to said support rail.

10. The invention of claim 9 wherein said elongated connector is a threaded screw.

11. The invention of claim 9 wherein said threaded connector is a pop rivet.

12. A hanger frame for being supported on horizontal supporting flanges, said hanger frame comprising a pair of parallel hanger support rails, a pair of parallel support beams each respectively being fixedly connected to one end of each of said parallel hanger support rails and a cantilever support flange extending inwardly from each end of each of said support beams so as to be capable of resting on one horizontal supporting flange.

13. The invention of claim 12 wherein said support rails are of hollow tubular construction and include plug means fixed in each end and including an opening for receiving an elongated connector extending from an associated support beam for fixedly connecting said associated support beam to said support rail.

* * * * *